(12) United States Patent
Higuchi et al.

(10) Patent No.: US 11,448,742 B2
(45) Date of Patent: Sep. 20, 2022

(54) RADAR DEVICE

(71) Applicant: MITSUBISHI ELECTRIC CORPORATION, Tokyo (JP)

(72) Inventors: Kazuhide Higuchi, Tokyo (JP); Jun Shimokawatoko, Tokyo (JP); Hiroyuki Mizutani, Tokyo (JP); Kenichi Tajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 83 days.

(21) Appl. No.: 17/083,903

(22) Filed: Oct. 29, 2020

(65) Prior Publication Data
US 2021/0063558 A1 Mar. 4, 2021

Related U.S. Application Data

(63) Continuation of application No. PCT/JP2018/019517, filed on May 21, 2018.

(51) Int. Cl.
*G01S 13/34* (2006.01)
*G01S 7/35* (2006.01)
*G01S 13/12* (2006.01)
*G01S 13/40* (2006.01)

(52) U.S. Cl.
CPC .............. *G01S 13/34* (2013.01); *G01S 7/352* (2013.01); *G01S 13/12* (2013.01); *G01S 13/341* (2013.01); *G01S 13/40* (2013.01)

(58) Field of Classification Search
CPC .......... G01S 13/34; G01S 7/352; G01S 13/12; G01S 13/341; G01S 13/40
See application file for complete search history.

(56) References Cited

U.S. PATENT DOCUMENTS

| | | |
|---|---|---|
| 2002/0180632 A1 | 12/2002 | Isaji |
| 2005/0184903 A1 | 8/2005 | Isaji |
| 2006/0103571 A1 | 5/2006 | Isaji |
| 2015/0198697 A1* | 7/2015 | Kishigami ............ G01S 7/2923 342/145 |

FOREIGN PATENT DOCUMENTS

| | | |
|---|---|---|
| JP | 2002-98753 A | 4/2002 |
| JP | 2003-161775 A | 6/2003 |
| JP | 2011-38993 A | 2/2011 |

OTHER PUBLICATIONS

International Search Report, issued in PCT/JP2018/019517, PCT/ISA/210, dated Jul. 31, 2018.

* cited by examiner

*Primary Examiner* — Matthew M Barker
(74) *Attorney, Agent, or Firm* — Birch, Stewart, Kolasch & Birch, LLP (57) ABSTRACT

The radar device is provided with a distance calculation unit that calculates a distance correspondence value corresponding to the distance to a target from a digital signal converted by a beat signal detection unit, and calculates the distance to the target from the distance correspondence value.

3 Claims, 9 Drawing Sheets

RADAR DEVICE

CROSS REFERENCE TO RELATED APPLICATIONS

This application is a Continuation of PCT International Application No. PCT/JP2018/019517 filed on May 21, 2018, which is hereby expressly incorporated by reference into the present application.

TECHNICAL FIELD

The present invention relates to a radar device that calculates the distance to a target.

BACKGROUND ART

The following Patent Literature 1 discloses a frequency modulated continuous wave (FMCW) radar device.

The FMCW radar device transmits a chirp signal whose frequency changes over time as a transmission wave, receives the reflected wave of the transmission wave reflected from an object to be measured, and generates a beat signal from the mixed wave of the reflected wave and the transmission wave.

The frequency of the beat signal corresponds to a time delay of the reflected wave. Therefore, the FMCW radar device calculates the distance to the object to be measured from the frequency of the beat signal.

CITATION LIST

Patent Literature

Patent Literature 1: JP 2002-98753 A

SUMMARY OF INVENTION

Technical Problem

The conventional radar device can calculate the distance to the object to be measured from the frequency of the beat signal, if the frequency of the beat signal is smaller than the Nyquist frequency of an analog-to-digital converter that converts the beat signal from an analog signal into a digital signal.

However, when the frequency of the beat signal is higher than the Nyquist frequency, the conventional radar device cannot calculate the distance to the object to be measured from the frequency of the beat signal, because the frequency of the beat signal folds back at the Nyquist frequency.

Therefore, the conventional radar device has a problem of being unable to calculate the distance to the object to be measured that is located so far away that the frequency of the beat signal is higher than the Nyquist frequency.

The present invention has been accomplished to solve the above problem, and an object of the present invention is to provide a radar device capable of calculating the distance to a target located so far away that the frequency of a beat signal is higher than the Nyquist frequency.

SOLUTION TO PROBLEM

A radar device according to the present invention includes: a radar signal generation unit that generates a radar signal whose frequency changes, over time, nonlinearly with respect to the time; a transmission and reception unit that transmits the radar signal generated by the radar signal generation unit as a reference wave, transmits the radar signal to a target, and receives a returning radar signal reflected from the target as a reflected wave; a beat signal detection unit that detects a beat signal indicating a difference frequency between a frequency of the reference wave output from the radar signal generation unit and a frequency of the reflected wave received by the transmission and reception unit, and converts the beat signal into a digital signal from an analog signal; and a distance calculation unit that calculates a distance correspondence value corresponding to the distance to the target from the digital signal converted by the beat signal detection unit and calculates the distance to the target from the distance correspondence value, wherein the distance calculation unit includes: an amount-of-change calculator that calculates an amount of change over time of a frequency indicated by the digital signal converted by the beat signal detection unit; an absolute value calculator that calculates an absolute value of the amount of change calculated by the amount-of-change calculator as the distance correspondence value corresponding to the distance to the target; and a distance calculator that calculates the distance to the target from the absolute value calculated by the absolute value calculator.

Advantageous Effects of Invention

According to the present invention, the radar device is configured so that the distance calculation unit calculates the distance correspondence value corresponding to the distance to the target from the digital signal converted by the beat signal detection unit, and calculates the distance to the target from the distance correspondence value. Therefore, the radar device according to the present invention can calculate the distance to the target located so far away that the frequency of the beat signal is higher than the Nyquist frequency.

DESCRIPTION OF EMBODIMENTS

In order to describe the present invention in more detail, a mode for carrying out the present invention will now be described with reference to the accompanying drawings.

First Embodiment

Figure 1:
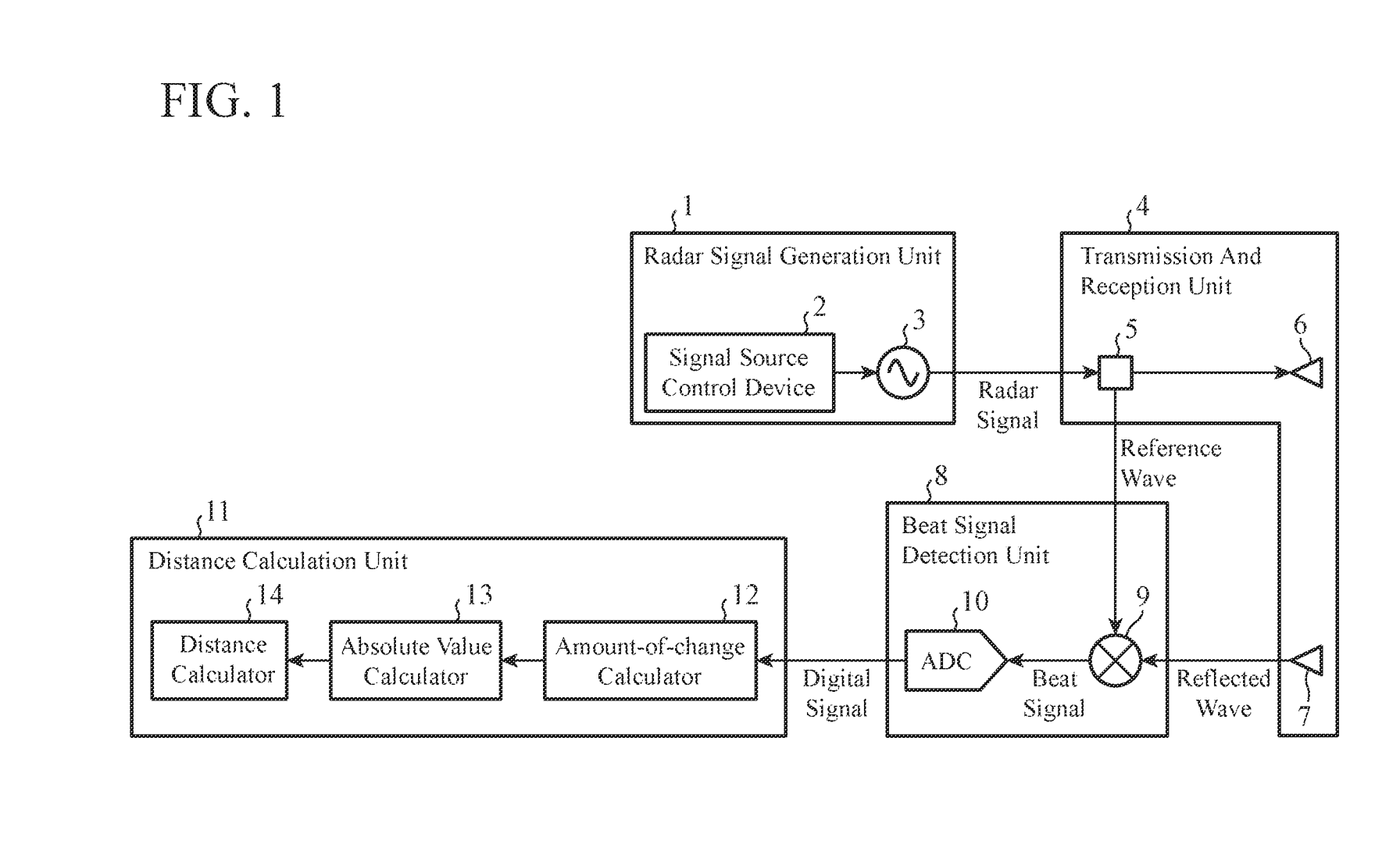
FIG. 1 is a diagram showing a configuration of a radar device according to a first embodiment.

FIG. 1 is a diagram showing a configuration of a radar device according to the first embodiment.

In FIG. 1, a radar signal generation unit 1 includes a signal source control device 2 and a signal source 3.

The radar signal generation unit 1 generates a radar signal whose frequency changes, over time, nonlinearly with respect to the time, and outputs the radar signal to a divider 5.

The signal source control device 2 is achieved by a look up table (LUT), a digital to analog converter (DAC), and the like.

The signal source control device 2 outputs, to the signal source 3, a control signal whose frequency monotonically increases or monotonically decreases over time and is nonlinear with respect to the time.

The signal source 3 is implemented by a circuit including a voltage controlled oscillator (VCO), a phased locked loop (PLL), or a direct digital synthesizer (DDS).

The signal source 3 is a signal source in which an oscillation frequency is controlled by a control signal output from the signal source control device 2, and the signal source 3 outputs a radar signal whose frequency changes, over time, nonlinearly with respect to the time to the divider 5.

A transmission and reception unit 4 includes the divider 5, a transmission antenna 6, and a reception antenna 7.

The transmission and reception unit 4 outputs the radar signal output from the signal source 3 to a frequency mixer 9 as a reference wave, transmits the radar signal toward a target, and receives a returning radar signal reflected from the target as a reflected wave.

The divider 5 is achieved by, for example, a Wilkinson divider.

The divider 5 divides the radar signal output from the signal source 3 into two, outputs one of the divided radar signals to the frequency mixer 9 as a reference wave, and outputs the other divided radar signal to the transmission antenna 6.

The transmission antenna 6 is achieved by, for example, a patch antenna.

The transmission antenna 6 transmits the radar signal output from the divider 5 toward the target.

The reception antenna 7 is achieved by, for example, a patch antenna.

The reception antenna 7 receives, as a reflected wave, a returning radar signal reflected from the target after the radar signal is transmitted toward the target from the transmission antenna 6.

A beat signal detection unit 8 includes the frequency mixer 9 and an analog-to-digital converter (ADC) 10.

The beat signal detection unit 8 detects a beat signal indicating a difference frequency between the frequency of the reference wave output from the divider 5 and the frequency of the reflected wave received by the reception antenna 7, and converts the beat signal from an analog signal into a digital signal.

The frequency mixer 9 is achieved by a Gilbert cell, a diode mixer, or the like.

The frequency mixer 9 detects the beat signal indicating a difference frequency between the frequency of the reference wave output from the divider 5 and the frequency of the reflected wave received by the reception antenna 7, and outputs the beat signal to the ADC 10.

The ADC 10 converts the beat signal output from the frequency mixer 9 from an analog signal into a digital signal, and outputs the digital signal to an amount-of-change calculator 12.

That is, the ADC 10 samples the beat signal output from the frequency mixer 9 at a sampling frequency $f_s$, temporally discretizes the beat signal, and quantizes the voltage value of the discretized beat signal, thereby converting the beat signal from an analog signal into a digital signal.

A distance calculation unit 11 includes the amount-of-change calculator 12, an absolute value calculator 13, and a distance calculator 14.

The distance calculation unit 11 calculates a distance correspondence value corresponding to the distance to the target from the digital signal output from the ADC 10, and calculates the distance to the target from the distance correspondence value.

The amount-of-change calculator 12 calculates an amount of change of the frequency over time indicated by the digital signal output from the ADC 10, and outputs the amount of change to the absolute value calculator 13.

The absolute value calculator 13 calculates the absolute value of the amount of change output from the amount-of-change calculator 12 as a distance correspondence value corresponding to the distance to the target, and outputs the absolute value to the distance calculator 14.

The distance calculator 14 calculates the distance to the target from the absolute value output from the absolute value calculator 13.

Here, each of the amount-of-change calculator 12, the absolute value calculator 13, and the distance calculator 14 is, for example, a single circuit, a composite circuit, a programmed processor, a parallel programmed processor, an application specific integrated circuit (ASIC), a field-programmable gate array (FPGA), or a combination of some of these circuits.

Each of the amount-of-change calculator 12, the absolute value calculator 13, and the distance calculator 14 is not limited to be implemented by dedicated hardware, but may be implemented by software, firmware, or a combination of software and firmware.

Software or firmware is stored in a memory of a computer as a program. The computer means hardware that executes the program, and may be, for example, a central processing unit (CPU), central processor, processing unit, computing unit, microprocessor, microcomputer, processor, or digital signal processor (DSP).

Next, the radar device shown in FIG. 1 will be described.

The signal source control device 2 outputs, to the signal source 3, a control signal whose frequency monotonically increases or monotonically decreases over time and is nonlinear with respect to the time.

The signal source control device 2 outputs, for example, a control signal whose waveform is represented by a quadratic function to the signal source 3.

When the control signal is received from the signal source control device 2, an oscillation frequency is controlled by the control signal in the signal source 3 and the signal source 3 outputs, to the divider 5, a radar signal whose frequency changes, over time, nonlinearly with respect to the time.

Figure 2:
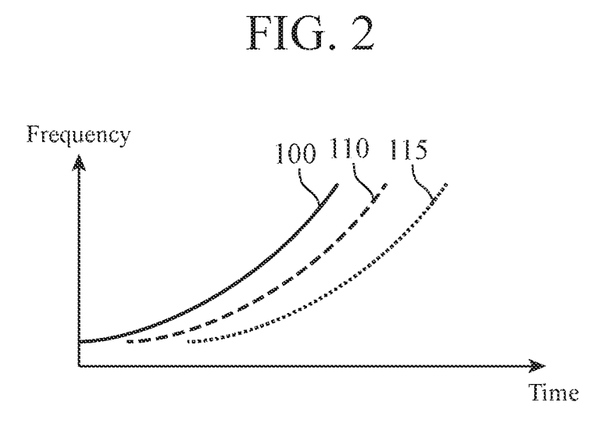
FIG. 2 is an explanatory diagram showing a radar signal whose frequency changes, over time, nonlinearly with respect to the time.

FIG. 2 is an explanatory diagram showing a radar signal whose frequency changes, over time, nonlinearly with respect to the time.

In FIG. 2, reference sign 100 denotes a radar signal output from the signal source 3.

The frequency $f_{tx}(t)$ of the radar signal 100 output from the signal source 3 can be expressed by the following Equation (1).

$$f_{tx}(t) = \alpha \cdot t^2 + \beta \cdot t + \gamma \qquad (1)$$

In Equation (1), t is time, and $\alpha$, $\beta$, and $\gamma$ are coefficients.

Further, the phase $\theta_{tx}(t)$ of the radar signal 100 can be expressed by the following Equation (2).

$$\theta_{tx}(t) = 2\pi \int f_{tx} dt = 2\pi (\tfrac{1}{3}\alpha t^3 + \tfrac{1}{2}\beta t^2 + \gamma t) + \varphi_0 \qquad (2)$$

The waveform of the frequency $f_{tx}(t)$ of the radar signal 100 shown in FIG. 2 is represented by a quadratic function, but this is merely an example. The waveform may be represented by a cubic function, for example.

When the waveform of the frequency $f_{tx}(t)$ of the radar signal 100 is represented by a cubic function, the signal source control device 2 outputs a control signal whose waveform is represented by a cubic function to the signal source 3.

When receiving the radar signal from the signal source 3, the divider 5 divides the radar signal into two, outputs one of the divided radar signals to the frequency mixer 9 as a reference wave, and outputs the other divided radar signal to the transmission antenna 6.

The transmission antenna 6 transmits the radar signal output from the divider 5 toward the target.

The radar signal transmitted from the transmission antenna 6 is reflected from the target.

The reception antenna 7 receives the returning radar signal reflected from the target as a reflected wave.

The radar signal received by the reception antenna 7 has a delay with respect to the radar signal transmitted from the transmission antenna 6 due to reciprocation between the target and the radar device.

Therefore, the radar signal received by the reception antenna 7 is represented as a radar signal 110 shown in FIG. 2.

The radar signal 110 shown in FIG. 2 is a radar signal when the distance from the radar device to the target is short, and a radar signal is represented as a radar signal 115 when the distance from the radar device to the target is long. The radar signal 115 has a larger delay time than the radar signal 110.

Here, "the distance to the target being short" and "the distance to the target being long" indicate differences in distance when two distances are compared.

The radar signal received by the reception antenna 7 is input to the frequency mixer 9.

The phase $\theta_{rx}(t)$ of the radar signal received by the reception antenna 7 can be expressed by the following Equation (3).

$$\theta_{rx}(t) = \theta_{tx}\left(t - \frac{2R}{c}\right) \qquad (3)$$

In Equation (3), c is the speed of light, and R is the distance to the target.

The frequency mixer 9 detects the beat signal indicating a difference frequency between the frequency of the reference wave output from the divider 5 and the frequency of the reflected wave received by the reception antenna 7, and outputs the beat signal to the ADC 10.

The phase $\theta_b(t)$ of the beat signal can be expressed by the following Equation (4).

$$\begin{aligned}\theta_b(t) &= \theta_{tx} - \theta_{rx} \qquad (4)\\ &= 2\pi \left[\alpha \cdot \frac{2R}{c} \cdot t^2 + \left\{-\alpha \cdot \left(\frac{2R}{c}\right)^2 + \beta \cdot \frac{2R}{c}\right\} \cdot t + \right.\\ &\quad \left. \frac{1}{3} \cdot \alpha \cdot \left(\frac{2R}{c}\right)^3 - \frac{1}{2} \cdot \beta \cdot \left(\frac{2R}{c}\right)^2 + \gamma \cdot \frac{2R}{c}\right]\end{aligned}$$

Further, the frequency $f_b(t)$ of the beat signal can be expressed by the following Equation (5).

$$f_b(t) = \frac{1}{2\pi} \cdot \frac{\partial \theta_b}{\partial t} = 2\alpha \cdot \frac{2R}{c} \cdot t - \alpha \cdot \left(\frac{2R}{c}\right)^2 + \beta \cdot \frac{2R}{c} \qquad (5)$$

The frequency $f_b(t)$ of the beat signal expressed by Equation (5) is a linear function with respect to time.

When receiving the beat signal from the frequency mixer 9, the ADC 10 converts the beat signal from an analog signal into a digital signal, and outputs the digital signal to the amount-of-change calculator 12.

That is, the ADC 10 samples the beat signal output from the frequency mixer 9 at a sampling frequency $f_s$, temporally discretizes the beat signal, and quantizes the voltage value of the discretized beat signal, thereby converting the beat signal from an analog signal into a digital signal.

Here, the amount of change over time of the frequency indicated by the beat signal output from the frequency mixer 9 corresponds to the distance to the target.

Figure 3:
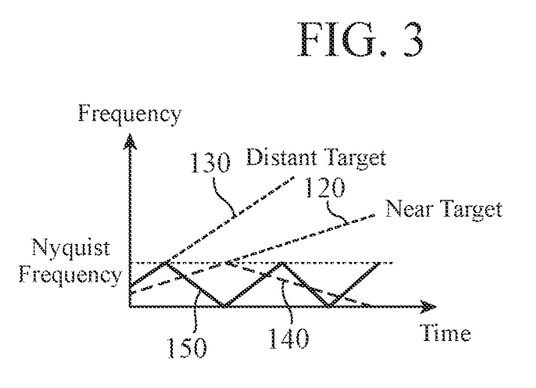
FIG. 3 is an explanatory diagram showing a change over time in frequency indicated by a beat signal output from a frequency mixer 9 and a change over time in frequency indicated by a digital signal output from an ADC 10.

FIG. 3 is an explanatory diagram showing a change over time in frequency indicated by the beat signal output from the frequency mixer 9 and a change over time in frequency indicated by the digital signal output from the ADC 10.

In FIG. 3, reference sign 120 denotes a change over time in frequency indicated by the beat signal when the distance to the target from the radar device is short, and reference sign 130 denotes a change over time in frequency indicated by the beat signal when the distance to the target from the radar device is long.

When distances from the radar device to the target are different, the slopes of the amounts of change of the frequencies over time indicated by the beat signals are different.

The frequency indicated by the digital signal output from the ADC 10 is folded back at the Nyquist frequency $f_n$ of the ADC 10 and 0 Hz. The Nyquist frequency $f_n$ is one half of the sampling frequency $f_s$.

Reference sign 140 denotes a change over time in frequency indicated by the digital signal when the distance to the target from the radar device is short, and reference sign 150 denotes a change over time in frequency indicated by the digital signal when the distance to the target from the radar device is long.

The frequency indicated by the digital signal is folded back at the Nyquist frequency $f_n$, and thus, changes from an increasing state over time to a decreasing state over time.

Further, the frequency indicated by the digital signal is folded back at 0 Hz, and thus changes from the decreasing state over time to the increasing state over time.

Figure 4:
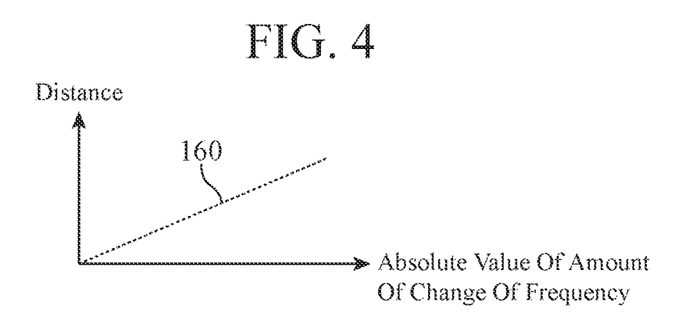
FIG. 4 is an explanatory diagram showing the relationship between an absolute value of an amount of change over time of the frequency indicated by the digital signal and the distance to a target.

FIG. 4 is an explanatory diagram showing the relationship between the absolute value of the amount of change over time of the frequency indicated by the digital signal and the distance to the target.

Reference sign 160 indicates a characteristic indicating the distance with respect to the absolute value of the amount of change.

When the distance from the radar device to the target is short, the slope of the characteristic 160 is small, and when the distance from the radar device to the target is long, the slope of the characteristic 160 is great.

When receiving the digital signal output from the ADC 10, the amount-of-change calculator 12 calculates an amount of change Δf of the frequency over time indicated by the digital signal by, for example, differentiating the frequency of the digital signal with respect to the time, and outputs the amount of change Δf to the absolute value calculator 13.

The time derivative of the frequency indicated by the digital signal corresponds to the amount of change Δf of the frequency over time indicated by the digital signal.

The sign of the time derivative is positive while the frequency indicated by the digital signal changes from 0 Hz to the Nyquist frequency $f_n$, and if the sign of the time derivative is positive, the frequency indicated by the digital signal increases over time.

While the frequency indicated by the digital signal changes from the Nyquist frequency $f_n$ to 0 Hz, the sign of the time derivative is negative, and if the sign of the time derivative is negative, the frequency indicated by the digital signal decreases over time.

When receiving the amount of change Δf from the amount-of-change calculator 12, the absolute value calculator 13 calculates the absolute value |Δf| of the amount of change Δf as a distance correspondence value corresponding to the distance to the target, and outputs the absolute value |Δf| to the distance calculator 14.

When receiving the absolute value |Δf| from the absolute value calculator 13, the distance calculator 14 calculates the distance R to the target from the absolute value |Δf| as expressed by the following Equation (6).

$$R = \frac{c \cdot |\Delta f|}{4 \cdot \alpha} \quad (6)$$

In the first embodiment described above, the radar device is configured so that the distance calculation unit 11 calculates the distance correspondence value corresponding to the distance to the target from the digital signal converted by the beat signal detection unit 8, and calculates the distance to the target from the distance correspondence value. Therefore, the radar device can calculate the distance to the target located so far away that the frequency of the beat signal is higher than the Nyquist frequency.

Second Embodiment

In the radar device according to the first embodiment, the distance calculation unit 11 includes the amount-of-change calculator 12, the absolute value calculator 13, and the distance calculator 14.

Figure 5:
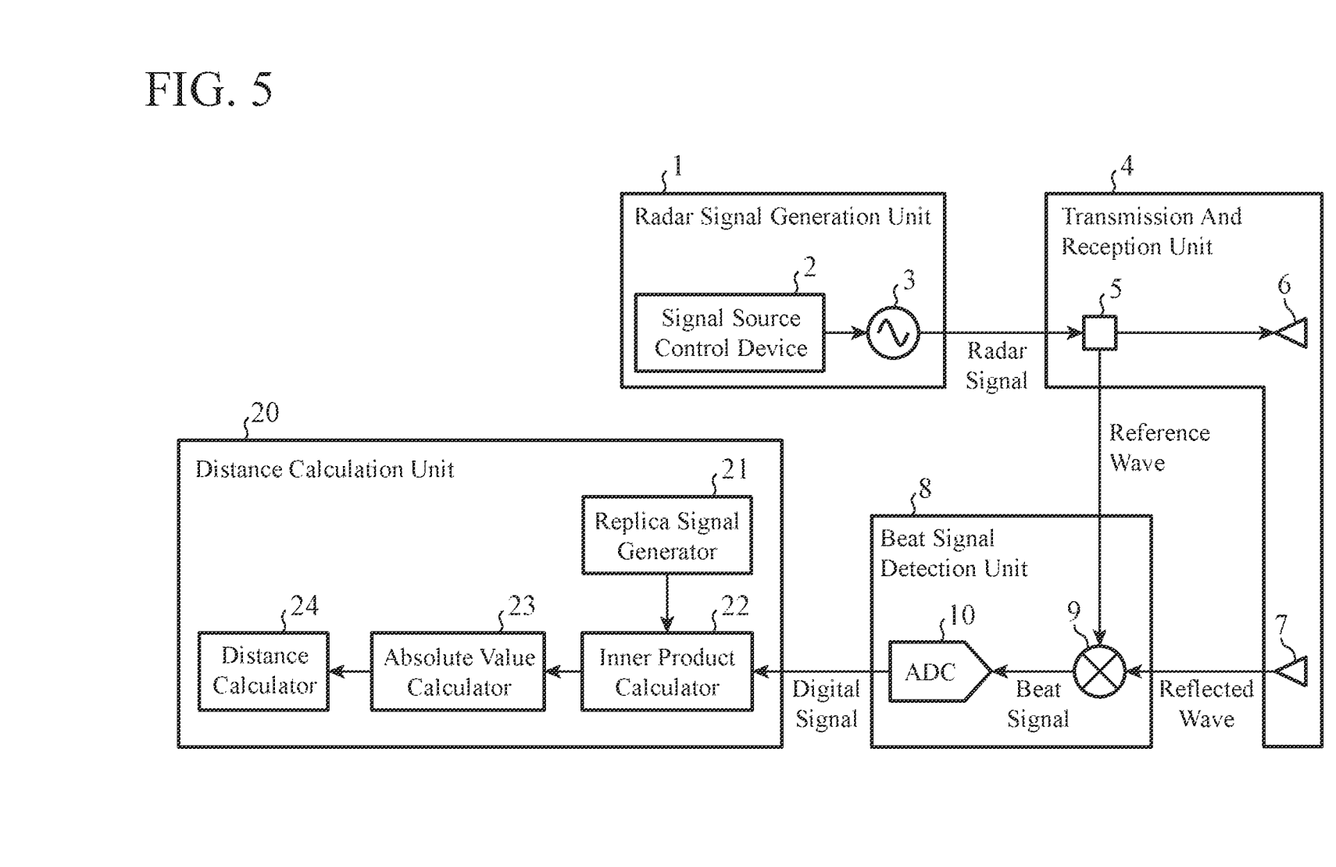
FIG. 5 is a diagram showing a configuration of a radar device according to a second embodiment.

The second embodiment describes a radar device provided with a distance calculation unit 20 that includes a replica signal generator 21, an inner product calculator 22, an absolute value calculator 23, and a distance calculator 24.

FIG. 5 is a diagram showing a configuration of the radar device according to the second embodiment. In FIG. 5, elements which are the same as or corresponding to the elements in FIG. 1 are identified by the same reference numerals, and thus, the description thereof will be omitted.

Similar to the distance calculation unit 11 shown in FIG. 1, the distance calculation unit 20 calculates a distance correspondence value corresponding to the distance to a target from a digital signal output from an ADC 10, and calculates the distance to the target from the distance correspondence value.

The replica signal generator 21 generates a signal having the same sampling period $t_s$ as the sampling period $t_s$ of the ADC 10 as a replica signal of the digital signal output from the ADC 10, and outputs the replica signal to the inner product calculator 22.

The inner product calculator 22 calculates the inner product of the digital signal output from the ADC 10 and the replica signal output from the replica signal generator 21.

The absolute value calculator 23 calculates the absolute value of the inner product calculated by the inner product calculator 22 as the distance correspondence value corresponding to the distance to the target, and outputs the absolute value of the inner product to the distance calculator 24.

The distance calculator 24 calculates the distance to the target from the absolute value output from the absolute value calculator 23.

Here, each of the replica signal generator 21, the inner product calculator 22, the absolute value calculator 23, and the distance calculator 24 is, for example, a single circuit, a composite circuit, a programmed processor, a parallel programmed processor, an ASIC, an FPGA, or a combination of some of these circuits.

Each of the replica signal generator 21, the inner product calculator 22, the absolute value calculator 23, and the distance calculator 24 is not limited to be implemented by dedicated hardware, but may be implemented by software, firmware, or a combination of software and firmware.

Next, the radar device shown in FIG. 5 will be described.

Note that, since the elements other than the distance calculation unit 20 are similar to those of the radar device shown in FIG. 1, the operation of the distance calculation unit 20 will be mainly described below.

If the sampling period of the ADC 10 is $t_s$, the phase $\theta_{ADC}(n)$ of the digital signal in the nth sampling of the ADC 10 can be expressed by the following Equation (7).

$$\theta_{ADC}(n) = 2\pi \left[ \alpha \cdot \frac{2R}{c} \cdot (t_s \cdot n)^2 + \left\{ -\alpha \cdot \left(\frac{2R}{c}\right)^2 + \beta \cdot \frac{2R}{c} \right\} \cdot (t_s \cdot n) + \frac{1}{3} \cdot \alpha \cdot \left(\frac{2R}{c}\right)^3 - \frac{1}{2} \cdot \beta \cdot \left(\frac{2R}{c}\right)^2 + \gamma \cdot \frac{2R}{c} \right] \quad (7)$$

The replica signal generator 21 generates a signal having the same sampling period $t_s$ as the sampling period $t_s$ of the ADC 10 as a replica signal of the digital signal output from the ADC 10, and outputs the replica signal to the inner product calculator 22.

For example, when it is assumed that the distance to the target is about 10 meters, the replica signal generator 21 generates a replica signal including a distance of 10 meters in the detection distance range of the target.

The phase $\theta_{REP}(n, r)$ of the replica signal output from the replica signal generator 21 can be expressed by the following Equation (8).

$$\theta_{REP}(n, r) = \qquad (8)$$

$$2\pi\left[\alpha \cdot \frac{2r}{c} \cdot (t_s \cdot n)^2 + \left\{-\alpha \cdot \left(\frac{2r}{c}\right)^2 + \beta \cdot \frac{2r}{c}\right\} \cdot (t_s \cdot n) + \frac{1}{3} \cdot \alpha \cdot \left(\frac{2r}{c}\right)^3 - \frac{1}{2} \cdot \beta \cdot \left(\frac{2r}{c}\right)^2 + \gamma \cdot \frac{2r}{c}\right]$$

In Equation (8), r is a distance included in the detection distance range of the target.

The sampling period $t_s$ of the replica signal output from the replica signal generator 21 is equal to the sampling period $t_s$ of the ADC 10. Therefore, similar to the frequency indicated by the digital signal output from the ADC 10, the frequency indicated by the replica signal is folded at the Nyquist frequency $f_n$ and 0 Hz.

The inner product calculator 22 calculates the inner product $X_r(r)$ of the digital signal output from the ADC 10 and the replica signal output from the replica signal generator 21 as expressed by the following Equation (9).

$$X_r(r) = \sum_{n=0}^{N-1} \{x_r(n) \cdot \cos(\theta_{REP}(n, r))\} \qquad (9)$$

In Equation (9), $x_r(n)$ is the digital signal output from the ADC 10, and N is the sampling number of the beat signal in the ADC 10.

Further, the inner product calculator 22 obtains a quadrature replica signal with respect to the replica signal output from the replica signal generator 21, and calculates the inner product $X_i(r)$ of the digital signal output from the ADC 10 and the quadrature replica signal as expressed by the following Equation (10).

$$X_i(r) = \sum_{n=0}^{N-1} \{-x_r(n) \cdot \sin(\theta_{REP}(n, r))\} \qquad (10)$$

The inner product calculator 22 outputs each of the inner product $X_r(r)$ and the inner product $X_i(r)$ to the absolute value calculator 23.

When receiving the inner product $X_r(r)$ and the inner product $X_i(r)$ from the inner product calculator 22, the absolute value calculator 23 calculates the absolute value $X(r)$ of the inner products $X_r(r)$ and $X_i(r)$ as the distance correspondence value corresponding to the distance to the target as expressed by the following Equation (11).

$$X(r) = \sqrt{\{X_r(r)\}^2 + \{X_i(r)\}^2} \qquad (11)$$

The absolute value calculator 23 outputs the absolute value $X(r)$ to the distance calculator 24.

When receiving the absolute value $X(r)$ from the absolute value calculator 23, the distance calculator 24 calculates the distance to the target from the absolute value $X(r)$.

That is, the distance calculator 24 sweeps the distance r with an arbitrary granularity in the detection distance range of the target, and searches for the distance r at which the absolute value $X(r)$ is maximum as the distance to the target.

Since the absolute value $X(r)$ of the inner product is proportional to the reflection intensity of the radar signal, the reflection intensity of the radar signal reflected from the target located at the distance r can also be obtained as $X(r)$.

In the second embodiment described above, the distance calculation unit 20 includes the replica signal generator 21 that generates a signal having the same sampling period $t_s$ as the sampling period $t_s$ of the ADC 10 as a replica signal of the digital signal output from the ADC 10, and the inner product calculator 22 that calculates the inner product of the digital signal output from the ADC 10 and the replica signal output from the replica signal generator 21. Further, the distance calculation unit 20 includes the absolute value calculator 23 that calculates, as a distance correspondence value corresponding to the distance to the target, the absolute value of the inner product calculated by the inner product calculator 22, and the distance calculator 24 that calculates the distance to the target from the absolute value calculated by the absolute value calculator 23.

Therefore, similar to the radar device according to the first embodiment, the radar device according to the second embodiment can calculate the distance to the target located so far away that the frequency of the beat signal is higher than the Nyquist frequency. The radar device according to the second embodiment can also obtain the reflection intensity of the radar signal reflected from the target.

Third Embodiment

Figure 6:
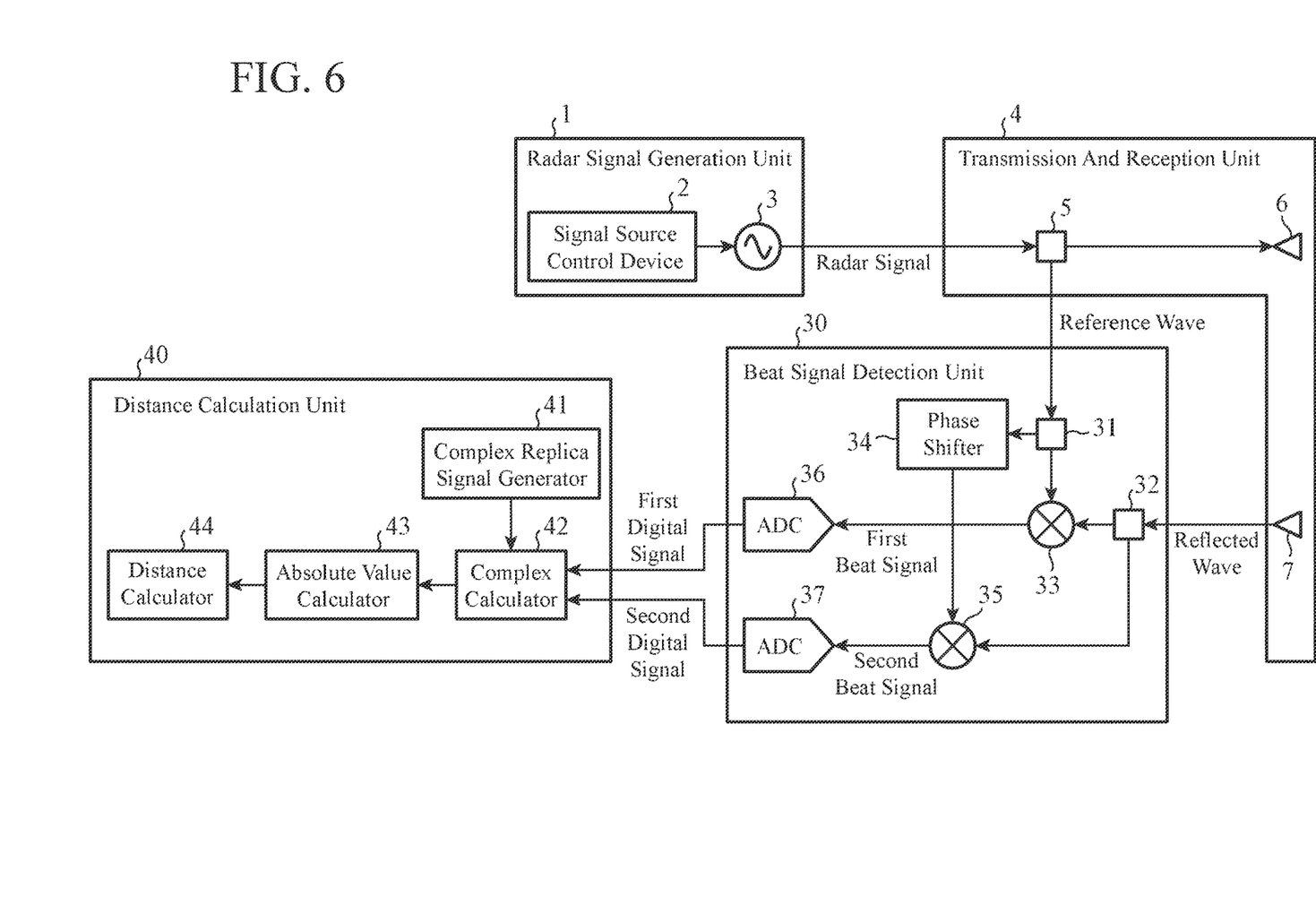
FIG. 6 is a diagram showing a configuration of a radar device according to a third embodiment.

The third embodiment describes a radar device provided with a distance calculation unit 40 that includes a complex replica signal generator 41, a complex inner product calculator 42, an absolute value calculator 43, and a distance calculator 44.

FIG. 6 is a diagram showing a configuration of the radar device according to the third embodiment. In FIG. 6, elements which are the same as or corresponding to the elements in FIG. 1 are identified by the same reference numerals, and thus, the description thereof will be omitted.

The beat signal detection unit 30 includes dividers 31 and 32, frequency mixers 33 and 35, a phase shifter 34, and ADCs 36 and 37.

The divider 31 divides a reference wave output from the divider 5 into two, outputs one of the divided reference waves to the frequency mixer 33, and outputs the other divided reference wave to the phase shifter 34.

The divider 32 divides a reflected wave received by the reception antenna 7 into two, outputs one of the divided reflected waves to the frequency mixer 33, and outputs the other divided reflected wave to the frequency mixer 35.

The frequency mixer 33 detects a first beat signal indicating a difference frequency between the frequency of the reference wave output from the divider 31 and the frequency of the reflected wave output from the divider 32, and outputs the first beat signal to the ADC 36.

The phase shifter 34 delays the phase of the reference wave output from the divider 31 by 90 degrees, and outputs the phase-delayed reference wave to the frequency mixer 35.

The frequency mixer 35 detects a second beat signal indicating a difference frequency between the frequency of the reference wave output from the phase shifter 34 and the frequency of the reflected wave output from the divider 32, and outputs the second beat signal to the ADC 37.

The ADC 36 converts the first beat signal output from the frequency mixer 33 from an analog signal into a first digital signal, and outputs the first digital signal to the complex inner product calculator 42.

The ADC 37 converts the second beat signal output from the frequency mixer 35 from an analog signal into a second digital signal, and outputs the second digital signal to the complex inner product calculator 42.

The distance calculation unit 40 calculates a distance correspondence value corresponding to the distance to the target from the first digital signal output from the ADC 36 and the second digital signal output from the ADC 37, and calculates the distance to the target from the distance correspondence value.

The complex replica signal generator 41 generates the same signal having a sampling period $t_s$ as the sampling period $t_s$ of the ADC 36 as a first replica signal of the first digital signal output from the ADC 36.

The complex replica signal generator 41 generates a signal having the same sampling period $t_s$ as the sampling period $t_s$ of the ADC 37 as a second replica signal of the second digital signal output from the ADC 37.

The complex replica signal generator 41 generates a complex replica signal that is a complex signal from the first replica signal and the second replica signal, and outputs the complex replica signal to the complex inner product calculator 42.

The complex inner product calculator 42 generates a complex digital signal which is a complex signal from the first digital signal output from the ADC 36 and the second digital signal output from the ADC 37.

The complex inner product calculator 42 calculates the inner product of the complex digital signal and the complex replica signal output from the complex replica signal generator 41.

The absolute value calculator 43 calculates the absolute value of the inner product calculated by the complex inner product calculator 42 as the distance correspondence value corresponding to the distance to the target.

The distance calculator 44 calculates the distance to the target from the absolute value calculated by the absolute value calculator 43.

Here, each of the complex replica signal generator 41, the complex inner product calculator 42, the absolute value calculator 43, and the distance calculator 44 is, for example, a single circuit, a composite circuit, a programmed processor, a parallel programmed processor, an ASIC, an FPGA, or a combination of some of these circuits.

Each of the complex replica signal generator 41, the complex inner product calculator 42, the absolute value calculator 43, and the distance calculator 44 is not limited to be implemented by dedicated hardware, but may be implemented by software, firmware, or a combination of software and firmware.

Next, the radar device shown in FIG. 6 will be described.

Note that, since the elements other than the beat signal detection unit 30 and the distance calculation unit 40 are similar to those of the radar device shown in FIG. 1, the operation of the beat signal detection unit 30 and the distance calculation unit 40 will be mainly described below.

When receiving the reference wave from the divider 5, the divider 31 divides the reference wave into two, outputs one of the divided reference waves to the frequency mixer 33, and outputs the other divided reference wave to the phase shifter 34.

The divider 32 divides the reflected wave received by the reception antenna 7 into two, outputs one of the divided reflected waves to the frequency mixer 33, and outputs the other divided reflected wave to the frequency mixer 35.

When receiving the reference wave from the divider 31 and the reflected wave from the divider 32, the frequency mixer 33 detects a first beat signal indicating a difference frequency between the frequency of the reference wave and the frequency of the reflected wave, and outputs the first beat signal to the ADC 36.

When receiving the reference wave from the divider 31, the phase shifter 34 delays the phase of the reference wave by 90 degrees, and outputs the phase-delayed reference wave to the frequency mixer 35.

When receiving the phase-delayed reference wave from the phase shifter 34 and the reflected wave from the divider 32, the frequency mixer 35 detects a second beat signal indicating a difference frequency between the frequency of the phase-delayed reference wave and the frequency of the reflected wave, and outputs the second beat signal to the ADC 37.

When receiving the first beat signal from the frequency mixer 33, the ADC 36 converts the first beat signal from an analog signal into a first digital signal $x_r(n)$, and outputs the first digital signal $x_r(n)$ to the complex inner product calculator 42.

When receiving the second beat signal from the frequency mixer 35, the ADC 37 converts the second beat signal from an analog signal into a second digital signal $x_i(n)$, and outputs the second digital signal $x_i(n)$ to the complex inner product calculator 42.

Similar to the ADC 10 shown in FIG. 1, the ADCs 36 and 37 sample the beat signals at the sampling frequency $f_s$.

The complex replica signal generator 41 generates the same signal having a sampling period $t_s$ as the sampling period $t_s$ of the ADC 36 as a first replica signal of the first digital signal output from the ADC 36.

Further, the complex replica signal generator 41 generates the same signal having a sampling period $t_s$ as the sampling period $t_s$ of the ADC 37 as a second replica signal of the second digital signal output from the ADC 37.

The complex replica signal generator 41 generates a complex replica signal $e^{-j\theta REP(n,r)}$ which is a complex signal from the first replica signal and the second replica signal, and outputs the complex replica signal $e^{-j\theta REP(n,r)}$ to the complex inner product calculator 42.

The complex inner product calculator 42 generates a complex digital signal $x(n)$ from the first digital signal $x_r(n)$ output from the ADC 36 and the second digital signal $x_i(n)$ output from the ADC 37 as expressed by the following Equation (12).

$$x(n) = x_r(n) + jx_i(n) \tag{12}$$

Next, the complex inner product calculator 42 calculates the inner product of the complex digital signal $x(n)$ and the complex replica signal $e^{-j\theta REP(n,r)}$ output from the complex replica signal generator 41, and outputs the inner product to the absolute value calculator 43.

When receiving the inner product from the complex inner product calculator 42, the absolute value calculator 43 calculates the absolute value $X(r)$ of the inner product as the distance correspondence value corresponding to the distance to the target as expressed by the following Equation (13).

$$X(r) = \left| \sum_{n=0}^{N-1} \{x(n) \cdot e^{-j\theta_{REP}(n,r)}\} \right| \tag{13}$$

The absolute value calculator 43 outputs the absolute value $X(r)$ of the inner product to the distance calculator 44.

When receiving the absolute value $X(r)$ from the absolute value calculator 43, the distance calculator 44 calculates the distance to the target from the absolute value $X(r)$.

That is, the distance calculator 44 sweeps the distance r with an arbitrary granularity in the detection distance range of the target, and searches for the distance r at which the absolute value X(r) is maximum as the distance to the target.

Since the absolute value X(r) of the inner product is proportional to the reflection intensity of the radar signal, the reflection intensity of the radar signal reflected from the target located at the distance r can also be obtained as X(r).

In the above third embodiment, the complex replica signal generator 41 generates the same signal having a sampling period $t_s$ as the sampling period $t_s$ of the ADC 36 as a first replica signal of the first digital signal output from the ADC 36. Further, the complex replica signal generator 41 generates the same signal having a sampling period $t_s$ as the sampling period $t_s$ of the ADC 37 as a second replica signal of the second digital signal output from the ADC 37. Furthermore, the complex replica signal generator 41 generates a complex replica signal that is a complex signal from the first replica signal and the second replica signal, and outputs the complex replica signal to the complex inner product calculator 42.

The complex inner product calculator 42 generates a complex digital signal that is a complex signal from the first digital signal output from the ADC 36 and the second digital signal output from the ADC 37, and calculates the inner product of the complex digital signal and the complex replica signal output from the complex replica signal generator 41. The absolute value calculator 43 calculates the absolute value of the inner product calculated by the complex inner product calculator 42 as the distance correspondence value corresponding to the distance to the target. Then, the distance calculator 44 calculates the distance to the target from the absolute value calculated by the absolute value calculator 43.

Therefore, similar to the radar device according to the second embodiment, the radar device according to the third embodiment can calculate the distance to the target located so far away that the frequency of the beat signal is higher than the Nyquist frequency. The radar device according to the third embodiment can also obtain the reflection intensity of the radar signal reflected from the target.

In the radar device according to the third embodiment, the complex inner product calculator 42 calculates the inner product of the complex digital signal and the complex replica signal, whereby the effect of noise on the calculation of the distance to the target can be reduced.

In the radar device shown in FIG. 6, the beat signal detection unit 30 includes the phase shifter 34 that delays the phase of the reference wave output from the divider 31 by 90 degrees, and outputs the phase-delayed reference wave to the frequency mixer 35.

Figure 7:
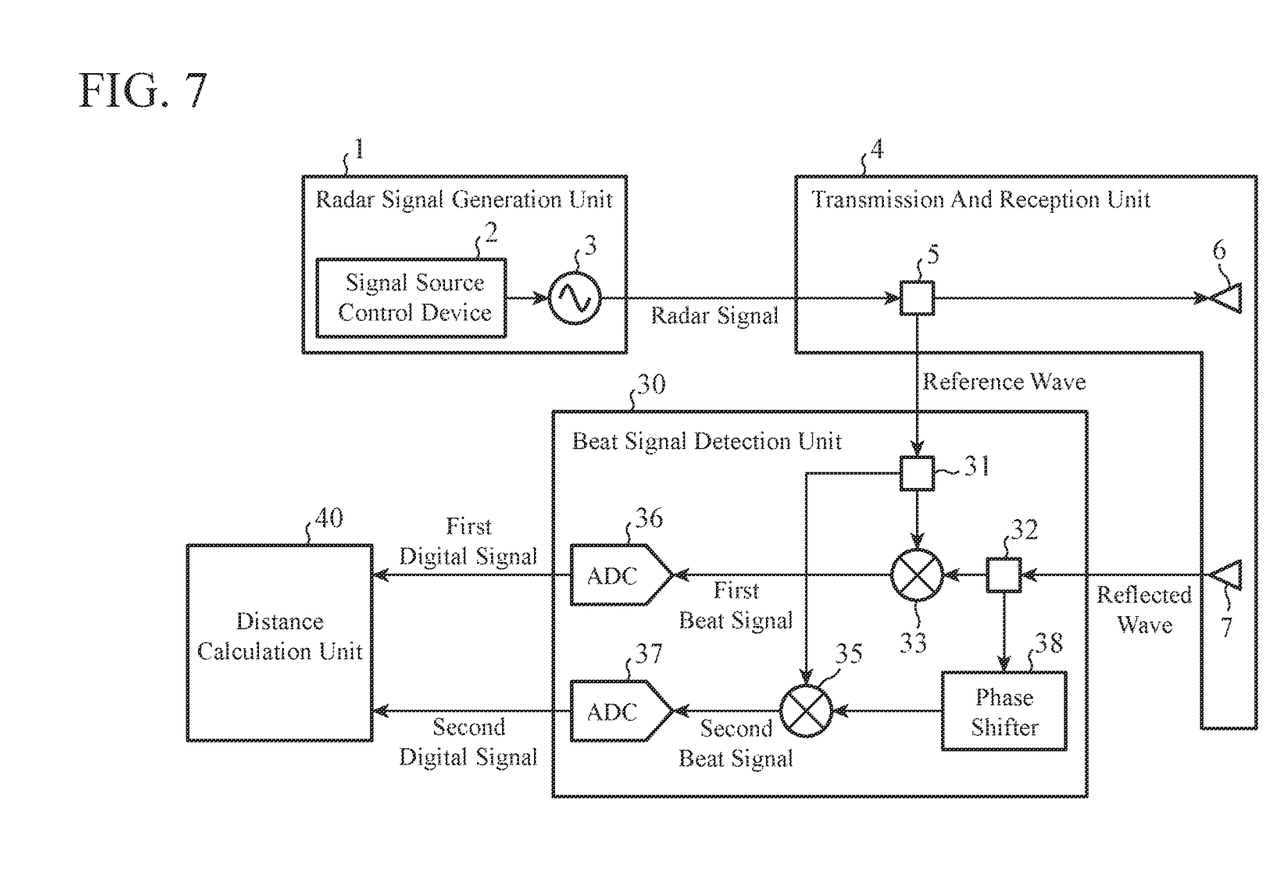
FIG. 7 is a diagram showing a configuration of another radar device according to the third embodiment.

In a radar device shown in FIG. 7, the beat signal detection unit 30 may include, instead of the phase shifter 34, a phase shifter 38 that delays the phase of the frequency of the reflected wave output from the divider 32 by 90 degrees, and outputs the phase-delayed reflected wave to the frequency mixer 35. Even if the beat signal detection unit 30 includes the phase shifter 38 instead of the phase shifter 34, each of the first digital signal and the second digital signal can be output to the complex inner product calculator 42 of the distance calculation unit 40.

FIG. 7 is a diagram showing a configuration of another radar device according to the third embodiment.

In the radar device shown in FIG. 6, the ADCs 36 and 37 convert the first and second beat signals into first and second digital signals from analog signals, respectively, by sampling the first and second beat signals at the same sampling frequency $f_s$.

Figure 8:
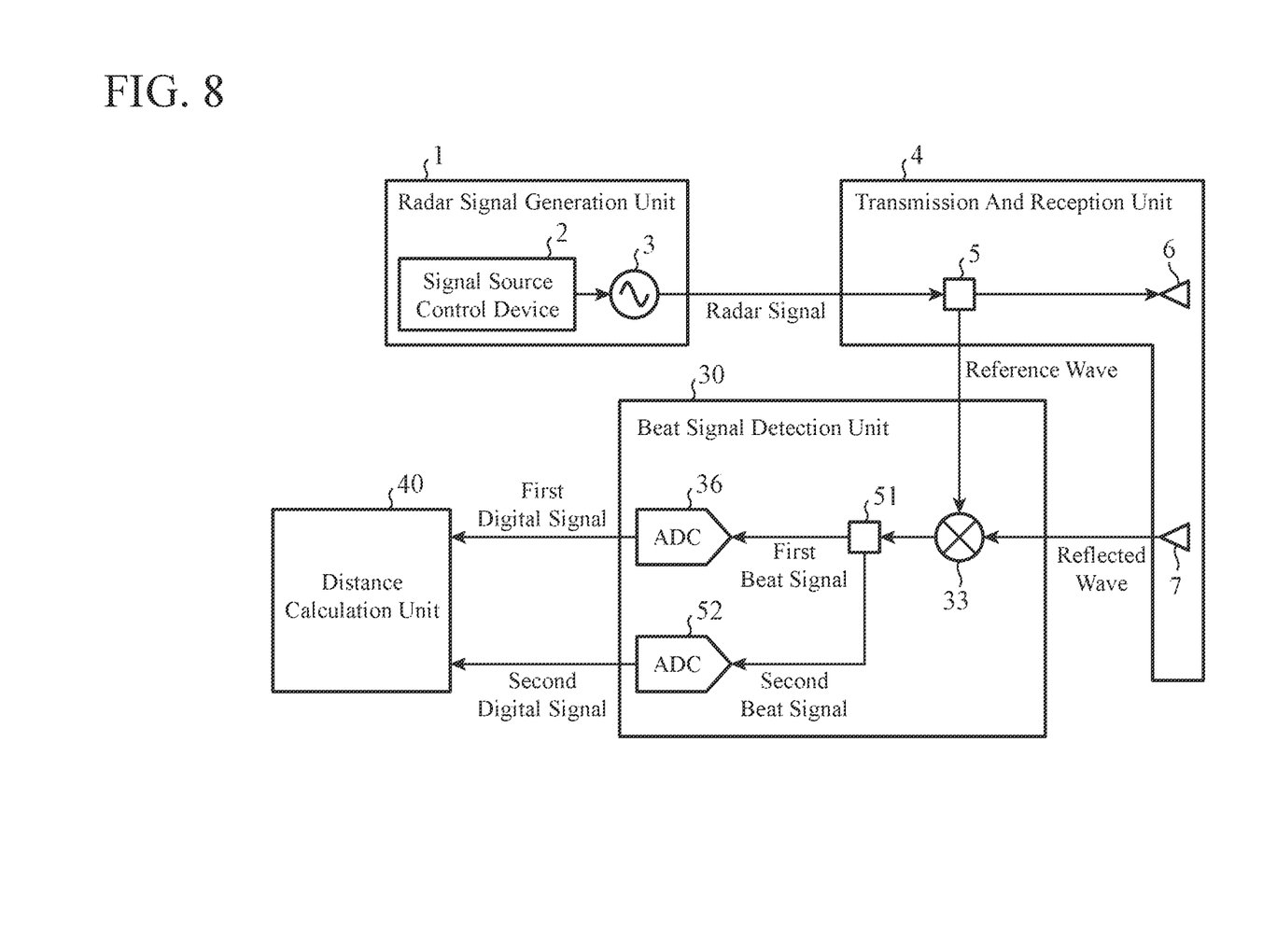
FIG. 8 is a diagram showing a configuration of still another radar device according to the third embodiment.

In a radar device shown in FIG. 8, an ADC 52 converts the second beat signal into a second digital signal from an analog signal at a sampling period delayed by 90 degrees in phase with respect to the sampling period is of the first beat signal in the ADC 36.

FIG. 8 is a diagram showing a configuration of still another radar device according to the third embodiment.

In the radar device shown in FIG. 8, the beat signal detection unit 30 includes a divider 51.

The divider 51 divides the beat signal output from the frequency mixer 33 into two, outputs one of the divided beat signals to the ADC 36 as a first beat signal, and outputs the other divided beat signal to the ADC 52 as a second beat signal.

Even if the beat signal detection unit 30 includes the divider 51 and the ADC 52, each of the first digital signal and the second digital signal can be output to the complex inner product calculator 42 of the distance calculation unit 40.

Fourth Embodiment

Figure 9:
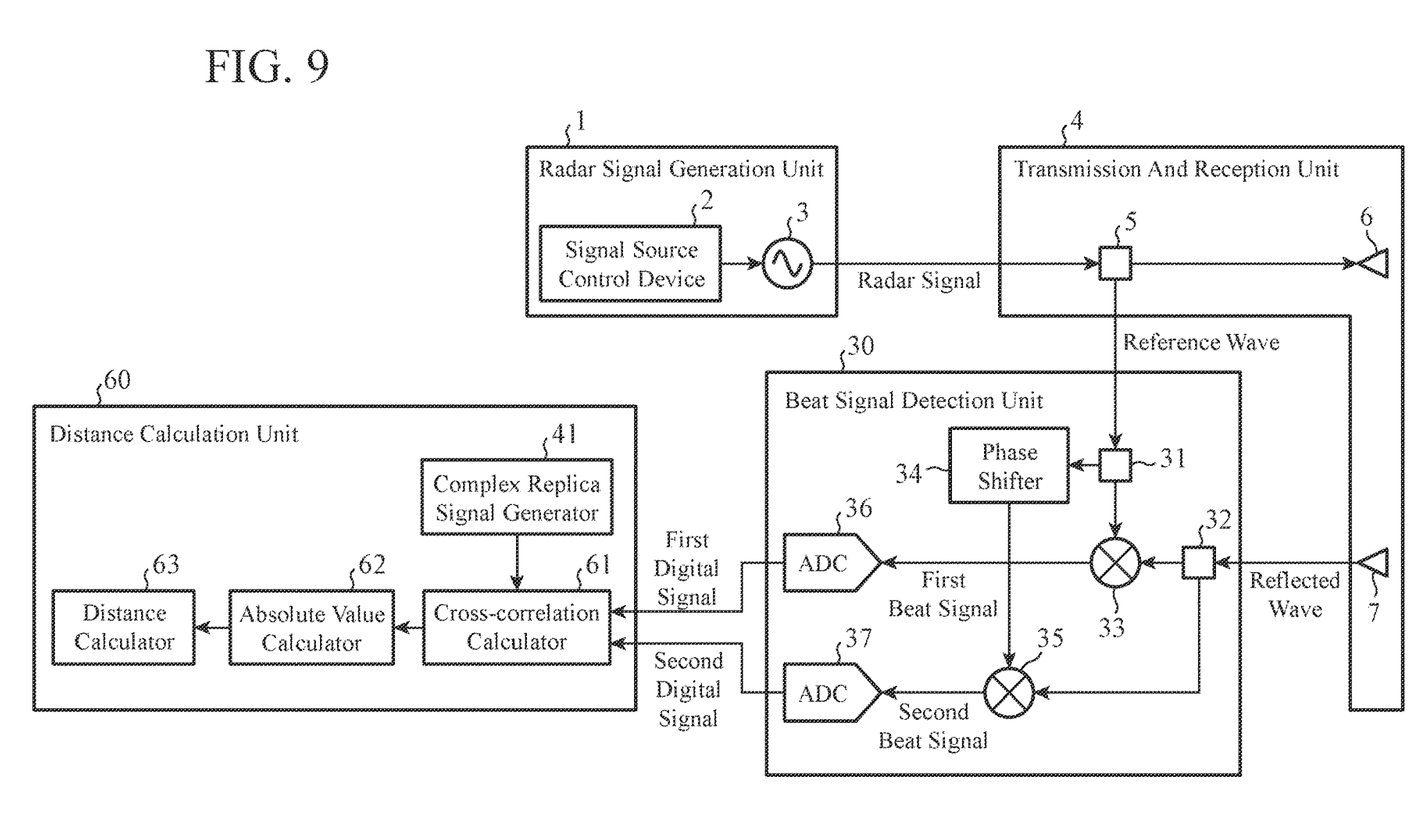
FIG. 9 is a diagram showing a configuration of a radar device according to a fourth embodiment.

The fourth embodiment describes a radar device provided with a distance calculation unit 60 that includes a complex replica signal generator 41, a cross-correlation calculator 61, an absolute value calculator 62, and a distance calculator 63.

FIG. 9 is a diagram showing a configuration of the radar device according to the fourth embodiment. In FIG. 9, elements which are the same as or corresponding to the elements in FIGS. 1 and 6 are identified by the same reference numerals, and thus, the description thereof will be omitted.

The distance calculation unit 60 calculates a distance correspondence value corresponding to the distance to the target from a first digital signal output from an ADC 36 and a second digital signal output from an ADC 37, and calculates the distance to the target from the distance correspondence value.

The cross-correlation calculator 61 generates a complex digital signal which is a complex signal from the first digital signal output from the ADC 36 and the second digital signal output from the ADC 37.

The cross-correlation calculator 61 calculates a cross-correlation between the complex digital signal and the complex replica signal output from the complex replica signal generator 41.

The absolute value calculator 62 calculates the absolute value of the cross-correlation calculated by the cross-correlation calculator 61 as the distance correspondence value corresponding to the distance to the target.

The distance calculator 63 calculates the distance to the target from the absolute value calculated by the absolute value calculator 62.

Here, each of the cross-correlation calculator 61, the absolute value calculator 62, and the distance calculator 63 is, for example, a single circuit, a composite circuit, a programmed processor, a parallel programmed processor, an ASIC, an FPGA, or a combination of some of these circuits.

Each of the cross-correlation calculator 61, the absolute value calculator 62, and the distance calculator 63 is not limited to be implemented by dedicated hardware, but may be implemented by software, firmware, or a combination of software and firmware.

Next, the radar device shown in FIG. 9 will be described.

Note that, since the elements other than the distance calculation unit 60 are similar to those of the radar device shown in FIG. 6, the operation of the distance calculation unit 60 will be mainly described below.

The complex replica signal generator 41 generates a signal having the same sampling period $t_s$ as the sampling period $t_s$ of the ADC 36 as a first replica signal of the first digital signal output from the ADC 36.

Further, the complex replica signal generator 41 generates a signal having a sampling period $t_s$ same as the sampling period $t_s$ of the ADC 37 as a second replica signal of the second digital signal output from the ADC 37.

The complex replica signal generator 41 generates a complex replica signal $e^{-j\theta REP(n,r)}$ which is a complex signal from the first replica signal and the second replica signal, and outputs the complex replica signal $e^{-j\theta REP(n,r)}$ to the cross-correlation calculator 61.

Similar to the complex inner product calculator 42 shown in FIG. 6, the cross-correlation calculator 61 generates a complex digital signal x(n) from the first digital signal $x_r(n)$ output from the ADC 36 and the second digital signal $x_i(n)$ output from the ADC 37. The complex digital signal x(n) is a signal expressed by Equation (12).

Next, the cross-correlation calculator 61 calculates the cross-correlation Y(r, m) between the complex digital signal x(n) and the complex replica signal $e^{-j\theta REP(n,r)}$ output from the complex replica signal generator 41 as represented by Equation (14) below, and outputs the cross-correlation Y(r, m) to the absolute value calculator 62.

$$Y(r, m) = \begin{cases} \sum_{n=0}^{N-m-1} \{x(n+m) \cdot e^{-j\theta REP(n,r)}\} & m \geq 0 \\ Y^*(r, -m) & m < 0 \end{cases} \quad (14)$$

In Equation (14), m is a variable.

When receiving the cross-correlation Y(r, m) from the cross-correlation calculator 61, the absolute value calculator 62 calculates the absolute value |Y(r, m)| of the cross-correlation Y(r, m) as the distance correspondence value corresponding to the distance to the target.

In Equation (14), the absolute value |Y(r, m)| that is the maximum when m is changed corresponds to the distance r to the target, as expressed by Equation (15) below.

$$Z(r) = \max |Y(r, m)| \quad (15)$$

The absolute value calculator 62 outputs the absolute value |Y(r, m)| of the cross-correlation Y(r, m) to the distance calculator 63.

When receiving the absolute value |Y(r, m)| from the absolute value calculator 62, the distance calculator 63 calculates the distance to the target from the absolute value |Y(r, m)|.

That is, the distance calculator 63 sweeps the distance r with an arbitrary granularity in the detection distance range of the target, and searches for the distance r at which the absolute value |Y(r, m)| is maximum as the distance to the target.

Since the absolute value |Y(r, m)| of the cross-correlation Y(r, m) is proportional to the reflection intensity of the radar signal, the reflection intensity of the radar signal reflected from the target located at the distance r can also be obtained as Y(r, m).

Further, since the cross-correlation is used, even if the phase of the beat signal deviates from the phase of the replica signal due to sampling timing, noise, or the like, it is possible to obtain information regarding the reflection intensity.

In the above fourth embodiment, the complex replica signal generator 41 generates the same signal having a sampling period $t_s$ as the sampling period $t_s$ of the ADC 36 as a first replica signal of the first digital signal output from the ADC 36. Further, the complex replica signal generator 41 generates the same signal having a sampling period $t_s$ as the sampling period $t_s$ of the ADC 37 as a second replica signal of the second digital signal output from the ADC 37. Furthermore, the complex replica signal generator 41 generates a complex replica signal that is a complex signal from the first replica signal and the second replica signal, and outputs the complex replica signal to the cross-correlation calculator 61.

The cross-correlation calculator 61 generates a complex digital signal that is a complex signal from the first digital signal output from the ADC 36 and the second digital signal output from the ADC 37, and calculates the cross-correlation between the complex digital signal and the complex replica signal output from the complex replica signal generator 41. The absolute value calculator 62 calculates the absolute value of the cross-correlation calculated by the cross-correlation calculator 61 as the distance correspondence value corresponding to the distance to the target. Then, the distance calculator 63 calculates the distance to the target from the absolute value calculated by the absolute value calculator 62.

Therefore, the radar device according to the fourth embodiment can calculate the distance to the target located so far away that the frequency of the beat signal is higher than the Nyquist frequency. Further, the radar device according to the fourth embodiment can also obtain the reflection intensity of the radar signal reflected from the target.

In the radar device according to the fourth embodiment, the cross-correlation calculator 61 calculates the cross-correlation between the complex digital signal and the complex replica signal. Therefore, even if the phase of the beat signal deviates from the phase of the replica signal due to sampling timing, noise, or the like, it is possible to obtain information regarding the reflection intensity.

In the radar device shown in FIG. 9, the beat signal detection unit 30 includes the phase shifter 34 that delays the phase of the reference wave output from the divider 31 by 90 degrees, and outputs the phase-delayed reference wave to the frequency mixer 35.

Figure 10:
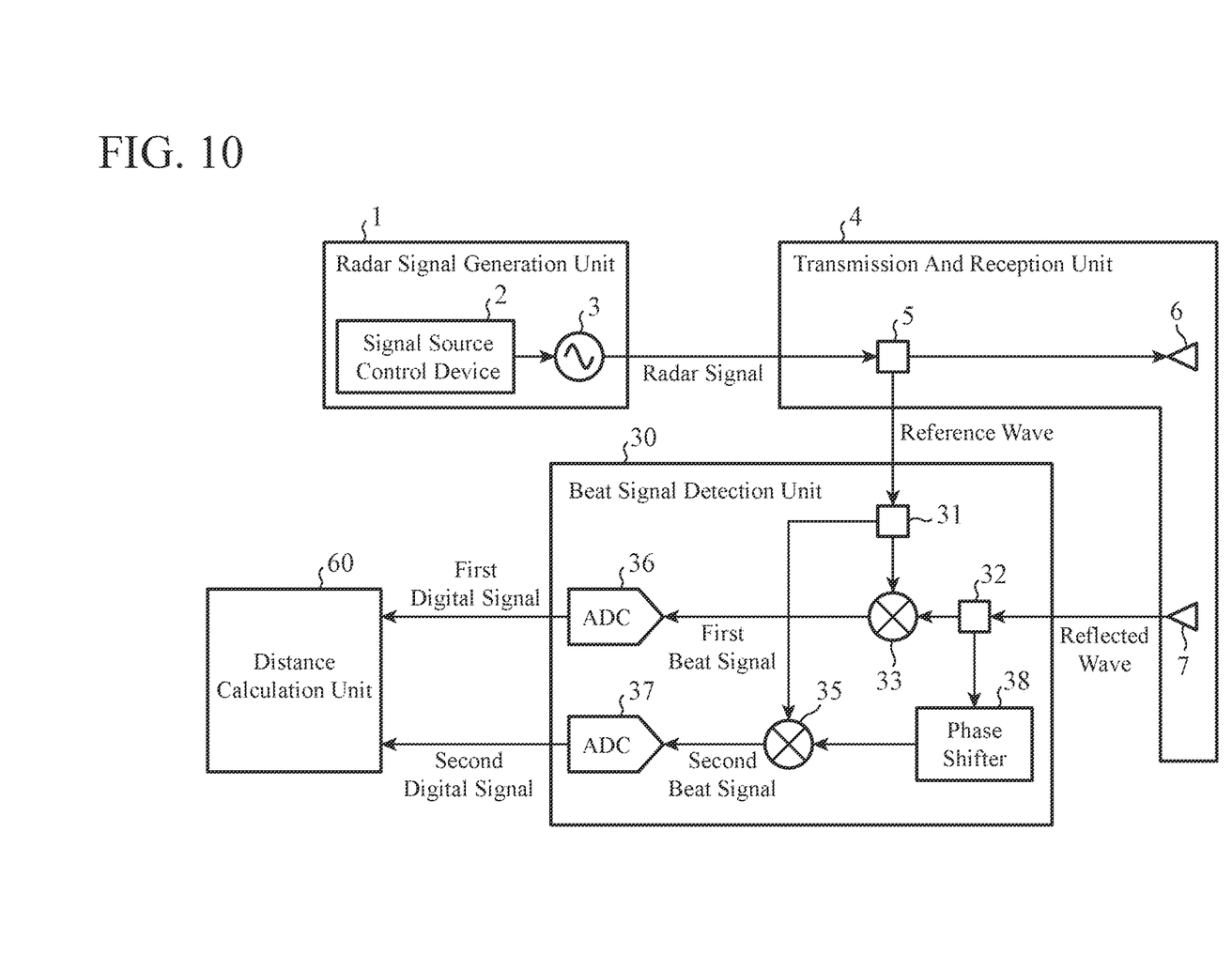
FIG. 10 is a diagram showing a configuration of another radar device according to the fourth embodiment.

In a radar device shown in FIG. 10, the beat signal detection unit 30 may include, instead of the phase shifter 34, a phase shifter 38 that delays the phase of the frequency of the reflected wave output from the divider 32 by 90 degrees, and outputs the phase-delayed reflected wave to the frequency mixer 35. Even if the beat signal detection unit 30 includes the phase shifter 38 instead of the phase shifter 34, each of the first digital signal and the second digital signal can be output to the cross-correlation calculator 61 of the distance calculation unit 60.

FIG. 10 is a diagram showing a configuration of another radar device according to the fourth embodiment.

In the radar device shown in FIG. 9, the ADCs 36 and 37 convert the first and second beat signals into first and second digital signals from analog signals, respectively, by sampling the first and second beat signals at the same sampling frequency $f_s$.

Figure 11:
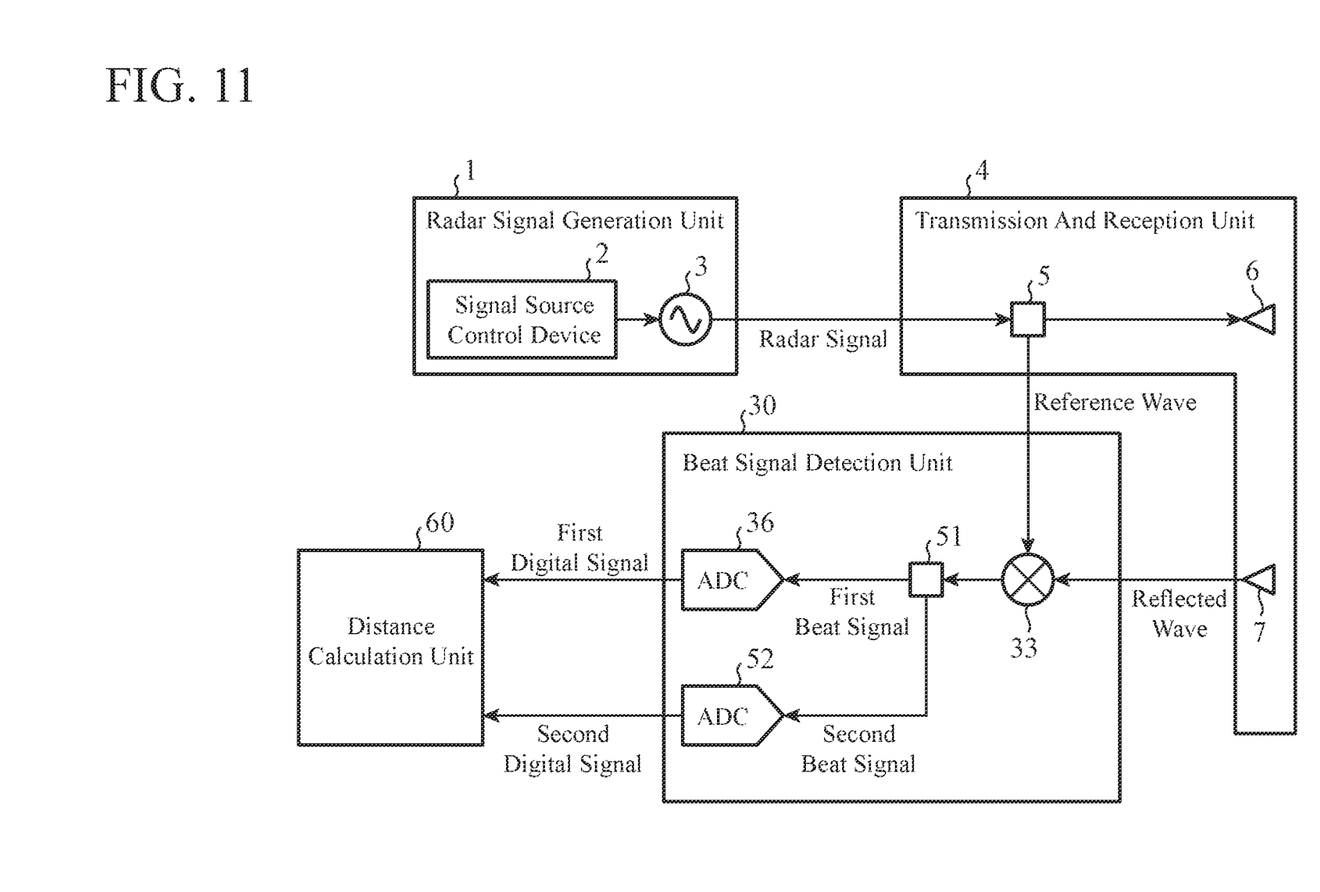
FIG. 11 is a diagram showing a configuration of still another radar device according to the fourth embodiment.

In a radar device shown in FIG. 11, an ADC 52 converts the second beat signal into a second digital signal from an analog signal at a sampling period delayed by 90 degrees in phase with respect to the sampling period $t_s$ of the first beat signal in the ADC 36.

FIG. 11 is a diagram showing a configuration of another radar device according to the fourth embodiment.

In the radar device shown in FIG. 11, the beat signal detection unit 30 includes a divider 51.

The divider 51 divides the beat signal output from the frequency mixer 33 into two, outputs one of the divided beat signals to the ADC 36 as a first beat signal, and outputs the other divided beat signal to the ADC 52 as a second beat signal.

Even if the beat signal detection unit 30 includes the divider 51 and the ADC 52, each of the first digital signal and the second digital signal can be output to the cross-correlation calculator 61 of the distance calculation unit 60.

It is to be noted that two or more of the above embodiments can be freely combined, or arbitrary components in the embodiments can be modified or omitted, within the scope of the present invention.

INDUSTRIAL APPLICABILITY

The present invention is suitable for a radar device that calculates the distance to a target.

REFERENCE SIGNS LIST

1: radar signal generation unit, 2: signal source control device, 3: signal source, 4: transmission and reception unit, 5: divider, 6: transmission antenna, 7: reception antenna, 8, 30: beat signal detection unit, 9: frequency mixer, 10: ADC, 11, 20, 40, 60: distance calculation unit, 12: amount-of-change calculator, 13: absolute value calculator, 14: distance calculator, 21: replica signal generator, 22: inner product calculator, 23: absolute value calculator, 24: distance calculator, 31, 32: divider, 33, 35: frequency mixer, 34, 38: phase shifter, 36, 37: ADC, 40: distance calculation unit, 41: complex replica signal generator, 42: complex inner product calculator, 43: absolute value calculator, 44: distance calculator, 51: divider, 52: ADC, 61: cross-correlation calculator, 62: absolute value calculator, 63: distance calculator, 100, 110, 115: radar signal, 120, 130: change over time in frequency indicated by beat signal, 140, 150: change over time in frequency indicated by digital signal, 160: characteristic indicating distance with respect to absolute value of amount of change

The invention claimed is:

1. A radar device comprising:
processing circuitry to
generate a radar signal whose frequency changes, over time, nonlinearly with respect to the time;
output the generated radar signal as a reference wave, transmit the radar signal to a target, and receive a returning radar signal reflected from the target as a reflected wave;
detect a beat signal indicating a difference frequency between a frequency of the output reference wave and a frequency of the received reflected wave, and convert the beat signal into a digital signal from an analog signal; and
calculate a distance correspondence value corresponding to the distance to the target from the converted digital signal and calculate the distance to the target from the distance correspondence value,
generate, as a replica signal of the digital signal, a signal having a sampling period same as a sampling period of the beat signal upon conversion of the beat signal from an analog signal into the digital signal;
calculate an inner product of the converted digital signal and the generated replica signal;
calculate, as the distance correspondence value corresponding to the distance to the target, an absolute value of the calculated inner product; and
calculate the distance to the target from the calculated absolute value.

2. The radar device according to claim 1,
wherein the processing circuitry further converts the beat signal that is defined as a first beat signal into a first digital signal from an analog signal and converts a second beat signal that is delayed in phase by 90 degrees with respect to the first beat signal into a second digital signal from an analog signal, and
the processing circuitry generates, as a first replica signal of the first digital signal, a signal having a same sampling period as a sampling period of the first beat signal upon conversion of the first beat signal into the first digital signal from an analog signal, generates, as a second replica signal of the second digital signal, a signal having the sampling period, and generates a complex replica signal that is a complex signal from the first replica signal and the second replica signal;
generates a complex digital signal that is a complex signal from the first digital signal and the second digital signal and calculates an inner product of the complex digital signal and the complex replica signal;
calculates, as the distance correspondence value corresponding to the distance to the target, an absolute value of the calculated inner product; and
calculates the distance to the target from the calculated absolute value.

3. The radar device according to claim 1,
wherein the processing circuitry further divides the beat signal in two, one of the divided signals being a first beat signal, and the other of the divided signals being a second beat signal, converts the first beat signal into a first digital signal from an analog signal, and converts the second beat signal into a second digital signal from an analog signal at a sampling period that is delayed in phase by 90 degrees with respect to a sampling period of the first beat signal upon conversion of the first beat signal from the analog signal into the first digital signal, and
the processing circuitry
generates, as a first replica signal of the first digital signal, a signal having a same sampling period as the sampling period of the first beat signal, generates, as a second replica signal of the second digital signal, a signal having a same sampling period as the sampling period of the second beat signal, and generates a complex replica signal that is a complex signal from the first replica signal and the second replica signal;
generates a complex digital signal that is a complex signal from the first digital signal and the second digital signal and calculates an inner product of the complex digital signal and the complex replica signal;
calculates, as the distance correspondence value corresponding to the distance to the target, an absolute value of the calculated inner product; and
calculates the distance to the target from the calculated absolute value.

\* \* \* \* \*